United States Patent [19]

Burns et al.

[11] 4,352,134
[45] Sep. 28, 1982

[54] MAGNETIC HEAD ASSEMBLY WITH CORROSION RESISTANT CONDUCTIVE WIRE

[75] Inventors: Terry A. Burns, Milpitas, Calif.; Leslie H. Johnston, Tucson, Ariz.

[73] Assignee: International Business Machines Corporation, Armonk, N.Y.

[21] Appl. No.: 95,282

[22] Filed: Nov. 19, 1979

[51] Int. Cl.³ .............................................. G11B 5/20
[52] U.S. Cl. ........................... 360/123; 174/110 SR; 174/119 C; 174/126 CP; 360/103
[58] Field of Search ...... 174/126 CP, 119 C, 110 SR; 360/123, 103

[56] References Cited

U.S. PATENT DOCUMENTS

| | | | |
|---|---|---|---|
| 2,879,191 | 3/1959 | Nippert | 148/11.5 |
| 3,077,462 | 2/1963 | Fitzhugh | 174/110 SR X |
| 3,297,855 | 1/1967 | Bowers | 174/126 CP |
| 3,323,116 | 5/1967 | Solyst | 360/103 |
| 3,683,103 | 8/1972 | Mancino | 174/126 CP X |
| 3,692,294 | 9/1972 | Nye | 174/126 CP X |
| 3,823,416 | 7/1974 | Warner | 360/103 |
| 3,975,771 | 8/1976 | Lazzari | 360/104 |
| 4,250,530 | 2/1981 | Yang | 360/103 X |

FOREIGN PATENT DOCUMENTS

| | | | |
|---|---|---|---|
| 596029 | 12/1947 | United Kingdom | 174/119 C |
| 1373049 | 11/1974 | United Kingdom | |

OTHER PUBLICATIONS

T.A. Burns, Corrosion Resistant/Brazable Magnet Wire, IBM Tech. Dis. Bull., vol. 16, #11, Apr. 1974.

Primary Examiner—Richard R. Kucia
Attorney, Agent, or Firm—N. N. Kallman

[57] ABSTRACT

A conductive wire useful with a magnetic head assembly is formed from a zirconium/copper alloy core, which is plated with a corrosion resistant conductive metal, such as gold. The wire is preferably covered with insulation, such as polyurethane.

4 Claims, 2 Drawing Figures

MAGNETIC HEAD ASSEMBLY WITH CORROSION RESISTANT CONDUCTIVE WIRE

DESCRIPTION

Technical Field

This invention relates to a novel conductive wire useful for a magnetic head assembly.

An object of this invention is to provide a magnetic head assembly incorporating an improved conductive wire that has high tensile strength, high yield strength, high elongation, and high conductivity.

Another object of this invention is to provide a magnetic head assembly utilizing a conductive wire that is corrosion resistant.

Another object is to provide a head assembly with a conductive wire that is subject to less wire breakage and kinking.

A further object is to provide a head assembly that employs a conductive wire that is stiffer and which experiences less electrical shorting and insulation degradation, which problems may result from in-process assembly fatigue as well as normal product flexing.

Background Art

Conductive wires, particularly those having very small diameters such as the fine coil wires used in magnetic head assemblies, are subject to kinks and breakage and other degrading effects, both during head assembly manufacture and when in use in moving magnetic elements in the field. Also, presently known wires tend to suffer from corrosion, and experience breaks and shorts when employed in the field. In addition, when processing read/write data represented by signals of relatively small amplitude, the resistivity of the wire used in the electrical circuitry is very significant in that loss of signal adversely impacts the accuracy of detection of data signals. It would be highly desirable to have a high strength, highly conductive corrosion resistant electrical wire, which may be used for magnetic head coil wire, without degradation and which affords high yield during production.

Description of the Drawing

The invention will be described in detail with reference to the drawings in which.

Preferred Embodiment of the Invention

Figure 1:
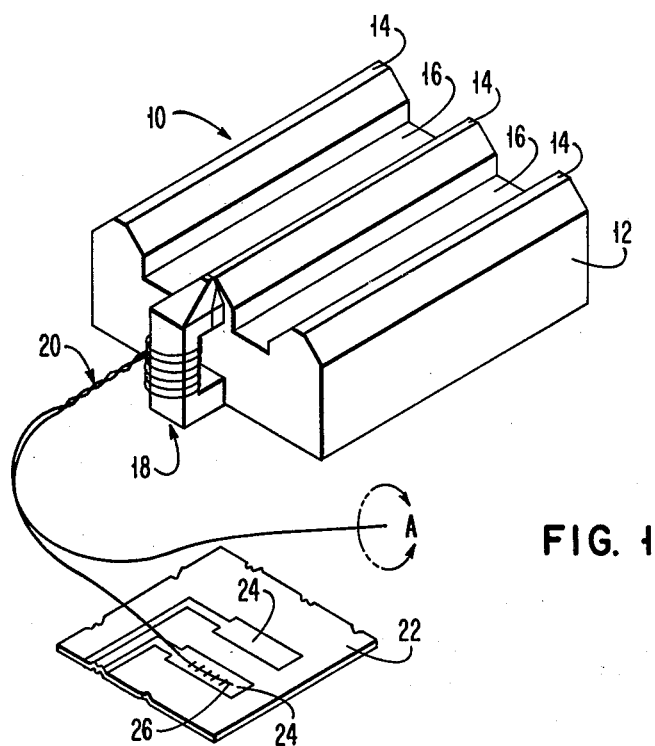
FIG. 1 is an isometric view of a magnetic head assembly, depicting the use of the novel conductive wire.

With reference to FIG. 1, a magnetic head assembly 10 is illustrated, including an air bearing slider 12, having rails 14 and recesses 16 to provide a desired flying height. Attached to one end of the slider 12 is a transducer assembly 18, having a transducing gap in the same plane as the center rail 14. Coupled to the transducer core 18, which may be made of ferrite, is a coiled wire 20 which leads to a printed circuit assembly board 22 carrying required printed circuit termination pads 24. The wire 20 is attached to the printed circuit pads by means of a fluxless solder reflow termination connection 26.

Figure 2:
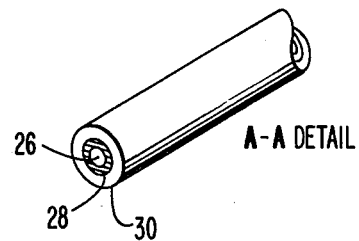
FIG. 2, is a cross-sectional view of the conductive wire assembly, made in accordance with this invention.

In accordance with this invention, and as depicted in FIG. 2, the wire 20 is formed with a core 26 of a zirconium/copper alloy. The zirconium constitutes about 0.12% by weight of the zirconium/copper alloy. The cylindrical core 26 is encompassed by a gold conductive coating 28, which in turn is surrounded by a thicker insulating layer 30, of polyurethane by way of example. In a preferred embodiment, the diameter of the zirconium/copper alloy core 26 is about 0.002 inch, the gold layer 28 is about 30 microinches, and the insulator 30 is approximately 200 microinches.

To fabricate a wire made in accordance with this invention, raw stock consisting of a zirconium/copper rod having about 0.010 inch diameter is drawn down to about 0.006 inches outer diameter. The drawn rod is then annealed in an environment of 90% nitrogen and 10% hydrogen at 650° C. at a rate of about 150 ft. per minute.

The annealed metal is gold plated at about 80 ft. per minute, and drawn to an outer diameter of about 0.004 inch, and then again to an outer diameter of 0.002 inch. The drawn wire is then annealed in the same atmosphere of 90% nitrogen and 10% hydrogen at 650° C., and at a rate of 200 ft. per minute. The wire is then coated with the insulating layer, which may be polyurethane.

It has been found that wire made in this fashion has a very high strength, greater than 51,500 K pounds per square inch and that it has a high ductility greater than 20%. The wire is characterized by high conductivity, and is corrosion resistant. Furthermore, there is reduced exposure to breakage and kinking, and for electrical connection can be terminated by a fluxless solder reflow technique. During manufacture of the wire, there is a greater throughput due to substantially minimal breakage, and in the field there is significant reduction in wire degradation. The wire is particularly useful with small magnetic head assemblies, especially those which experience dynamic movement, such as in an accessing head disk file.

What is claimed is:

1. In a bidirectional accessing magnetic head assembly characterized by:
   a transducer core for bidirectional movement during accessing by said head assembly;
   a coiled wire coupled to said core for moving bidirectionally with said transducer core;
   the improvement wherein said wire is formed from a zirconium-copper alloy core;
   a layer of conductive metal deposited over said alloy core;
   an insulator coating surrounding said metal layer; and
   a circuit assembly attached to said wire by means of a fluxless solder reflow termination connection.

2. A magnetic head assembly as in claim 1, wherein the metal layer is made of gold.

3. A magnetic head assembly as in claim 1, wherein said alloy core consists of about 0.12% zirconium by weight.

4. A magnetic head assembly as in claim 1, wherein the diameter of said core is about 0.002 inch.

* * * * *

UNITED STATES PATENT AND TRADEMARK OFFICE
CERTIFICATE OF CORRECTION

PATENT NO. : 4,352,134
DATED : September 28, 1982
INVENTOR(S) : Terry A. Burns, Leslie H. Johnston It is certified that error appears in the above—identified patent and that said Letters Patent is hereby corrected as shown below:

[75] Inventors:

now reads Terry A. Burns, Milpitas, Calif.
                  Leslie H. Johnston, Tucson, Ariz.

should read Terry A. Burns, Milpitas, Calif.
                  Michael G. Hudick, Los Gatos, Calif.
                  Leslie H. Johnston, Tucson, Ariz.

Signed and Sealed this

Twenty-seventh Day of March 1984

[SEAL]

Attest:

GERALD J. MOSSINGHOFF

Attesting Officer    Commissioner of Patents and Trademarks